United States Patent
Lee

(10) Patent No.: US 9,860,521 B2
(45) Date of Patent: *Jan. 2, 2018

(54) IMAGE PROCESSING SYSTEM

(71) Applicant: LG INNOTEK CO., LTD., Seoul (KR)

(72) Inventor: Jun Seo Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 205 days.

This patent is subject to a terminal disclaimer.

(21) Appl. No.: 14/423,917

(22) PCT Filed: Aug. 28, 2013

(86) PCT No.: PCT/KR2013/007708
§ 371 (c)(1),
(2) Date: Feb. 25, 2015

(87) PCT Pub. No.: WO2014/035128
PCT Pub. Date: Mar. 6, 2014

(65) Prior Publication Data
US 2015/0222881 A1    Aug. 6, 2015

(30) Foreign Application Priority Data

Sep. 3, 2012  (KR) .................. 10-2012-0097102

(51) Int. Cl.
*H04N 13/02* (2006.01)
*H04N 5/265* (2006.01)
(Continued)

(52) U.S. Cl.
CPC ........... *H04N 13/0296* (2013.01); *G06T 7/50* (2017.01); *H04N 5/265* (2013.01); *H04N 5/33* (2013.01);
(Continued)

(58) Field of Classification Search
CPC ............ H04N 13/0239; H04N 13/025; H04N 13/0253; H04N 13/0271; H04N 13/0296;
(Continued)

(56) References Cited

U.S. PATENT DOCUMENTS

2010/0097495 A1\*  4/2010  Choe .................... G06T 5/50
                                                              348/235
2010/0128129 A1    5/2010  Kim
(Continued)

FOREIGN PATENT DOCUMENTS

KR    10-2012-0080939 A    7/2012
KR    10-2012-0084216 A    7/2012
(Continued)

OTHER PUBLICATIONS

Office Action dated Apr. 19, 2016 in Chinese Application No. 201380045997.6.
(Continued)

*Primary Examiner* — Mohammed Rahaman
*Assistant Examiner* — Richard Carter
(74) *Attorney, Agent, or Firm* — Saliwanchik Lloyd & Eisenschenk

(57) ABSTRACT

An image processing system is provided, the image processing system according to an exemplary embodiment of the present disclosure being configured to generate an accurate depth image even in a low light level by obtaining RGB images and/or IR images.

12 Claims, 2 Drawing Sheets

(51) Int. Cl.
*H04N 5/33* (2006.01)
*G06T 7/50* (2017.01)
*H04N 13/00* (2006.01)

(52) U.S. Cl.
CPC ....... *H04N 13/025* (2013.01); *H04N 13/0239* (2013.01); *H04N 13/0253* (2013.01); *H04N 13/0271* (2013.01); *H04N 2013/0081* (2013.01)

(58) Field of Classification Search
CPC .. H04N 5/265; H04N 5/33; H04N 2013/0081; G06T 7/0051; G06T 7/50
USPC .............................................. 348/47, 46, 235
See application file for complete search history.

(56) References Cited

U.S. PATENT DOCUMENTS

| | | | |
|---|---|---|---|
| 2011/0025827 A1 | 2/2011 | Shpunt et al. | |
| 2011/0175983 A1* | 7/2011 | Park | G03B 35/08 348/46 |
| 2011/0286661 A1 | 11/2011 | Lee et al. | |
| 2012/0050491 A1 | 3/2012 | Seshadri et al. | |
| 2012/0182394 A1* | 7/2012 | Bae | H04N 13/0011 348/46 |
| 2013/0107010 A1* | 5/2013 | Hoiem | G06T 7/0081 348/47 |
| 2015/0304631 A1* | 10/2015 | Lee | H04N 13/0239 348/46 |

FOREIGN PATENT DOCUMENTS

| | | |
|---|---|---|
| KR | 10-2012-0091970 A | 8/2012 |
| TW | 201044863 A | 12/2010 |
| TW | 201142769 A | 12/2011 |

OTHER PUBLICATIONS

Office Action dated Nov. 11, 2016 in Taiwanese Application No. 10521394790.

International Search Report in International Application No. PCT/KR2013/007707, filed Aug. 28, 2013.

* cited by examiner

[Fig. 1]
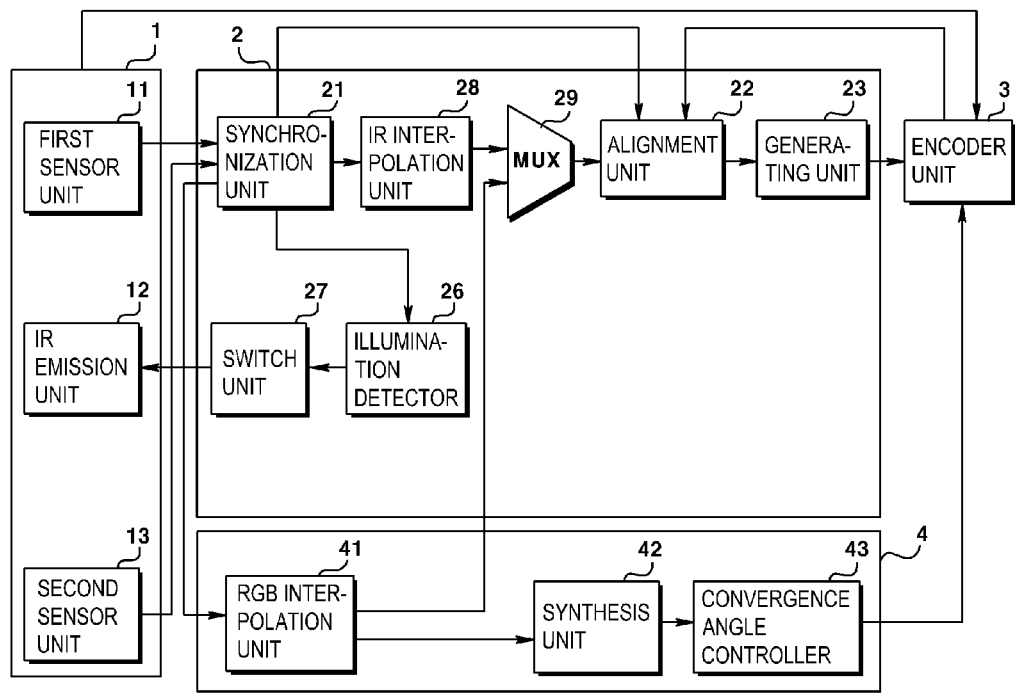
[Fig. 2]
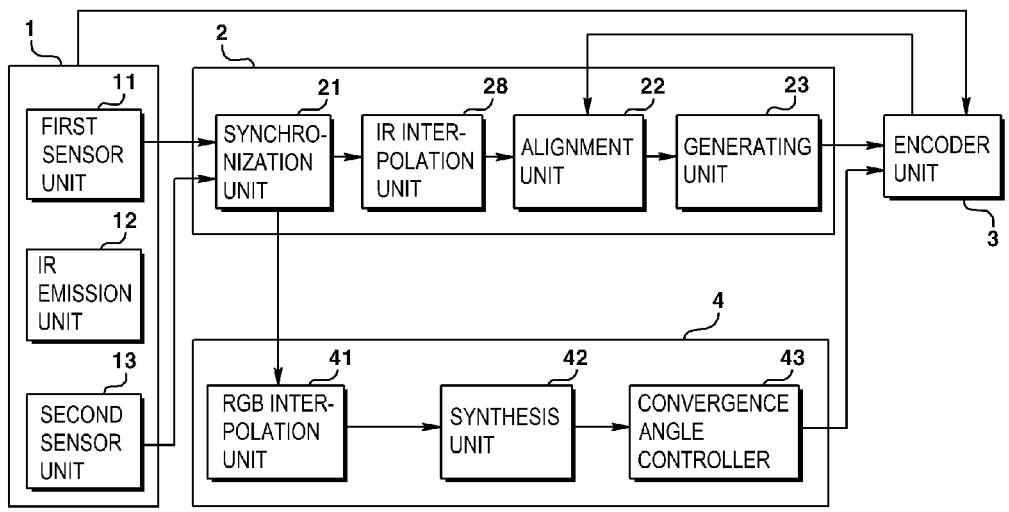

[Fig. 3]
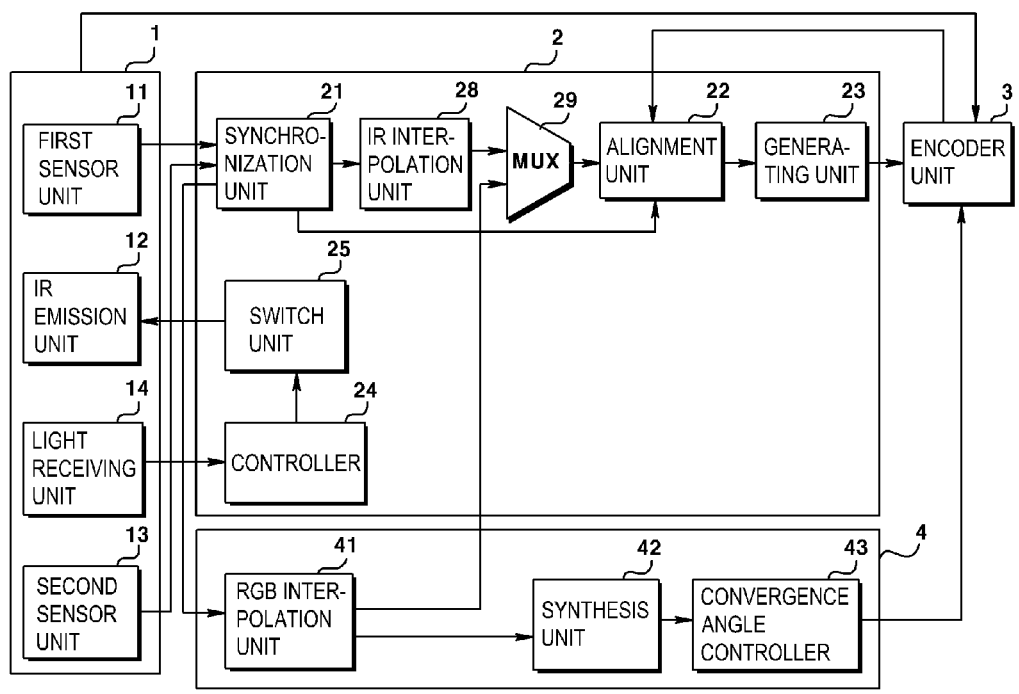

IMAGE PROCESSING SYSTEM

CROSS-REFERENCE TO RELATED APPLICATIONS

This application is the U.S. national stage application of International Patent Application No. PCT/KR2013/007708, filed Aug. 28, 2013, which claims priority to Korean Application No. 10-2012-0097102, filed Sep. 3, 2012, the disclosures of each of which are incorporated herein by reference in their entirety.

TECHNICAL FIELD

Exemplary aspects of the present disclosure relate to an image processing system.

BACKGROUND ART

As is well known, human vision is one of senses for obtaining information of surrounding environments, and can recognize a position of an object, and farness and closeness through two eyes. That is, visionary information inputted through two eyes is synthesized to one distance information to allow a human to freely activate. A stereo camera system may be the one used to realize a visionary structure into a machine.

The stereo camera system performs a stereo matching relative to an image obtained by using two cameras, where the stereo camera system obtains a depth image using binocular disparity of two cameras in the stereo matching process. Depth image data is used for recognition and a 3D image can be generated using the depth image data.

Meantime, it is difficult for a stereo camera to recognize an image under a low light level, thereby creating a problem in obtaining a depth image.

DISCLOSURE OF INVENTION

Technical Problem

Exemplary aspects of the present disclosure are to substantially solve at least the above problems and/or disadvantages and to provide at least the advantages as mentioned below. Thus, the present disclosure is directed to provide an image processing system configured to perform a stereo matching by obtaining an IR (Infrared) image in a low light level, and to output a 3D image.

Solution to Problem

In one general aspect of the present disclosure, there may be provided an image processing system, the system comprising: a camera unit configured to output left and right RGB (Red-Green-Blue) images and an IR (Infrared) images; a first generating unit configured to generate a depth image from the IR image received from the camera unit; and a second generating unit configured to generate a color image from the RBG images received from the camera unit.

In some exemplary of the present invention, the camera unit may comprise a first sensor unit configured to obtain a left RGB image and an IR image, a second sensor unit configured to obtain a right RGB image and an IR image, and at least one emission unit configured to emit an IR.

In some exemplary of the present invention, the first generating unit may comprise a synchronization unit configured to synchronize outputs of the first and second sensor units, and a third generating unit configured to generate a depth image from the left and right IR images received from the synchronization unit.

In some exemplary of the present invention, the second generating unit may comprise a synthesis unit configured to synthesize the left and right RGB images received from the synchronization unit.

In another general aspect of the present disclosure, there may be provided an image processing system, comprising: a camera unit configured to generate left and right RGB images, or RGB images and IR images (RGB/IR images); a first generating unit configured to: control the camera unit to obtain any one of the RGB images and RGB/IR images, and generate a depth image from the images received from the camera unit; and a second generating unit configured to generate a color image from the RBG images received from the camera unit.

In some exemplary of the present invention, the camera unit may comprises: a first sensor unit configured to obtain a left RGB image or RGB/IR image, a second sensor unit configured to obtain a right RGB image or RGB/IR image, a light receiving unit detecting illumination, and at least one first emission unit configured to emit an IR.

In some exemplary of the present invention, the first generating unit may comprises: a first controller configured to control ON and OFF of the first emission unit in response to the illumination detected by the light receiving unit, a first synchronization unit configured to synchronize outputs of the first and second sensor units, and a third generating unit configured to generate a depth image from the images received from the first synchronization unit.

In some exemplary of the present invention, the first generating unit may further comprises a first switching unit configured to switch ON and OFF of the first emission unit in response to control of the first controller.

In some exemplary of the present invention, the second generating unit may comprise a first synthesis unit configured to synthesize the left and right RGB images received from the first synchronization unit.

In some exemplary of the present invention, the first controller may control the first emission unit to be changed to ON state when the illumination detected by the light receiving unit is less than a predetermined illumination.

In some exemplary of the present invention, the camera unit may comprises: a third sensor unit configured to obtain a left RGB image or RGB/IR image, a fourth sensor unit configured to obtain a right RGB image or RGB/IR image, and at least one second emission unit configured to emit an IR.

In some exemplary of the present invention, the first generating unit may comprises: a second synchronization unit configured to synchronize outputs of the first and second sensor units, a fourth generating unit configured to generate a depth image from the images received from the second synchronization unit, and a second controller configured to control ON and OFF of the second emission unit in response to average brightness of pixels in an output image of the second synchronization unit.

In some exemplary of the present invention, the first generating unit may further comprise a second switching unit configured to switch ON and OFF of the second emission unit in response to control of the second controller.

In some exemplary of the present invention, the second generating unit may comprise a second synthesis unit configured to synthesize the left and right RGB images received from the second synchronization unit.

In some exemplary of the present invention, the second controller may control the second emission unit to be changed to ON state when the average of pixels of RGB images is less than a threshold.

Advantageous Effects of Invention

The image processing system according to an exemplary embodiment of the present disclosure has an advantageous effect in that an accurate depth image can be generated even under a low light level (illumination) by simultaneously obtaining an RGB image and an IR image through emission of IR to a target.

The image processing system according to an exemplary embodiment of the present disclosure has another advantageous effect in that the system can detect a low light level while performing a general operation under a normal light level, to obtain an IR image in addition to an RGB image, or only to obtain an IR image, whereby an accurate depth image can be generated using the IR image.

BRIEF DESCRIPTION OF DRAWINGS

FIG. 1 is a block diagram illustrating a image processing system according to a first exemplary embodiment of the present disclosure.

FIG. 2 is a block diagram illustrating a image processing system according to a second exemplary embodiment of the present disclosure.

FIG. 3 is a block diagram illustrating a image processing system according to a third exemplary embodiment of the present disclosure.

BEST MODE FOR CARRYING OUT THE INVENTION

Advantages and features of the present disclosure may be understood more readily by reference to the following detailed description of exemplary embodiments and the accompanying drawings. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

Now, exemplary embodiments of the present disclosure will be described in detail with reference to the accompanying drawings.

FIG. 1 is a block diagram illustrating a image processing system according to a first exemplary embodiment of the present disclosure.

Referring to FIG. 1, the image processing system according to the first exemplary embodiment of the present disclosure may comprise a camera unit (1), a depth image generating unit (2) and a color image generating unit (3), where a depth image of stereo image generated by the depth image generating unit (2) and a color image outputted from the color image generating unit (3) may be provided to an encoder unit (3). The encoder unit (3) serves to encode a stereo image received in H.264, for example, a detailed explanation of which will be omitted hereinafter, because the technique related to image encoding is well known to the skilled in the art, which is also applicable to other ensuing exemplary embodiments of the present disclosure.

Although the exemplary embodiment of the present disclosure has explained and illustrated that the camera unit (1), the depth image generating unit (2), the encoder unit (3) and the color image generating unit (4) are formed in separate hardware configuration, the present disclosure is not limited thereto, and thus, the camera unit (1), the depth image generating unit (2), the encoder unit (3) and the color image generating unit (4) may be realized in separate chips within same hardware (e.g., camera, etc.) or may be realized in one chip.

The camera unit (1) according to the exemplary embodiment of the present disclosure may comprise a first sensor unit (11), an IR (Infrared) emission unit (12) and a second sensor unit (13), and may obtain RGB (Red-Green-Blue) images and an IR image for a target. It should be apparent that components of the camera unit (1) according to the exemplary embodiment of the present disclosure are not limited to the alignment illustrated in the drawing.

The first and second sensor units (11 and 13) may be camera sensors such as CCD (Charged Coupled Device) sensors or CMOS (Complementary Metal-Oxide Semi-conductor) sensors, for example, and obtain left and right RGB images and IR images respectively. However, it should be apparent to the skilled in the art that the first and second sensor units (11 and 13) are not limited to the CCD sensors or the CMOS sensors, and any other devices capable of performing similar functions thereto may be used for the first and second sensor units (11 and 13).

In the exemplary embodiment of the present disclosure, explanation will be provided hereinafter for a case where an image obtained by the first sensor unit (11) is a left image and an image obtained by the second sensor unit (13) is a right image, for convenience sake. However, the present disclosure is not limited thereto.

The IR emission unit (12) may include a single IR device or plural IR devices, and emit an IR to the target. Although the IR emission device (12) may include an IR device such as an LD (Laser Diode) or an LED (Light Emitting Diode) in the exemplary embodiment of the present disclosure, the IR device is not limited thereto, and it should be apparent that application of IR devices capable of emitting an IR to a target is not ruled out.

Although the exemplary embodiment of the present disclosure has explained and illustrated one IR emission unit (12), the present disclosure is not limited thereto. That is, as the number of IR emission units (12) is increased, an output is also increased, which means that the increased number of IR emission units (12) can bring forth an increased IR recognition range capable of recognizing under a low light level and also to a remote distance, such that the number of IR emission units (12) may be determined in accordance with adequate recognition distance.

Meanwhile, the IR emission unit (12) including an LD has straightability, the image processing system according to the first exemplary embodiment of the present disclosure may further comprise a hardware splitter arranged at a front end of the IR emission unit (12) to disperse the IR emitted from the IR emission unit (12) in a predetermined pattern.

The first and second sensor units (11 and 13) according to the first exemplary embodiment of the present disclosure may simultaneously obtain the RGB images and the IR images generated by the IR emitted from the IR emission unit (12).

The depth image generating unit (2) of FIG. 1 comprises a synchronization unit (21), an IR interpolation unit (28), an alignment unit (22) and a generating unit (23).

The synchronization unit (21) may receive left and right RGB images and IR images from the first and second sensor units (11 and 13). The synchronization unit (21) may perform the synchronization of the received left and right images. The term of synchronization in the exemplary embodiment of the present disclosure means an equal alignment of time in which the left and right images are received. That is, the synchronization unit (21) performs the alignment in which the left and right images are received in an equal time.

The synchronization unit (21) may transmit the IR images out of the synchronized left and right images to the IR interpolation unit (28), and transmit the RGB images to an RGB interpolation unit (41) of the color image generating unit (4), whereby the images are interpolated by each interpolating unit (28 and 41), and may comprise a distribution unit (not shown) at a rear end thereof, whereby the distribution unit can distribute relevant RGB images and IR image to each interpolation unit (41 and 28).

The RGB interpolation unit (41) may receive the RGB images from the synchronization unit (21) and interpolate the RGB images, and the IR interpolation unit (44) may receive the IR images from the synchronization unit (23) and interpolate the IR images. The term of interpolation generally means that ambient pixels are averaged to make new pixels, and includes various interpolation methods, the details of which are well known to the skilled in the art and therefore omitted hereinafter.

Although the exemplary embodiment of the present disclosure has explained that the synchronization unit (21) transmits the IR image to the IR interpolation unit (28), and the IR interpolation unit (28) interpolates the IR image, and transmits the RGB images to the RGB interpolation unit (41) of the color image generating unit (4), where the RGB interpolation unit (41) interpolates the RGB images, the RGB interpolation unit (41) and the IR interpolation unit (28) may not be separately included, in a case the first and second sensor units (11 and 13) perform the interpolation, and in this case, the images interpolated by the first and second sensor units (11 and 13) may be transmitted to the synchronization unit (21), and the synchronization unit (21) may directly transmit the interpolation-completed RGB images and IR image to a synthesis unit (42) and the alignment unit (22) respectively.

The alignment unit (22) may perform a calibration so that the inputted left and right IR images are aligned. In the alignment process by the alignment unit (22), the encoder unit (3) may receive a calibration data from the first and second sensor units (11 and 13) of the camera unit (1), convert the calibration data to an alignment parameter and transmit to the alignment unit (22). The alignment unit (22) may perform the calibration to the inputted image, using the alignment parameter received from the encoder unit (3).

The generating unit (23) may generate a depth image using the aligned left and right images. The method for generating the depth image by the generating unit (23) may use a stereo matching method, but the present disclosure is not limited thereto and other various depth image generating methods may be utilized.

Meanwhile, the color image generating unit (4) according to the first exemplary embodiment of the present disclosure of FIG. 1 may comprise an RGB interpolation unit (41), a synthesis unit (42) and a convergence angle controller (43). The function of the RGB interpolation unit (41) has been already explained above.

The synthesis unit (42) may synthesize the left and right RGB images in a 3D format. The synthesis method is well known to include a side by side method and a top and bottom method. The image synthesized by the synthesis unit (42) is called a "color image" hereinafter.

The convergence angle controller (43) may control a convergence angle of the color image synthesized by the synthesis unit (42) so that a focus of the 3D image can realize a 3D effect without being swayed or shaken. The functions of the synthesis unit (42) and the convergence angle controller (43) are well known in the art so that no more detailed explanation will be provided hereinafter.

Now, operation of the image processing system according to the first exemplary embodiment of the present disclosure will be described.

In the image processing system according to the first exemplary embodiment of the present disclosure, the IR emission unit (12) is always in an ON state, and emits an IR to a target, while the first and second sensor units (11 and 13) obtain the RGB images and IR images respectively.

Thereafter, the synchronization unit (21) may perform the synchronization on the left and right RGB images and IR images, and transmit the performed IR images to the IR interpolation unit (28) and the RGB images to the RGB interpolation unit (41). To this end, a distribution unit configured to distribute the RGB images and the IR images may be arranged at a rear end of the synchronization unit (21), the configuration of which has been already explained above.

The IR interpolation unit (28) performs the interpolation on the transmitted IR images and outputs the interpolated IR images to the alignment unit (22). The alignment unit (22) may align the left and right images (which are IR images), and the generating unit (23) may generate a depth image from the aligned left and right images.

Meanwhile, the RGB images transmitted from the synchronization unit (21) to the RGB interpolation unit (41) may be interpolated by the RGB interpolation unit (41), where the interpolated images are provided to the synthesis unit (42) to be a color image, and the convergence angle controller (43) controls a convergence angle, whereby the color image can be outputted. The outputted color image may be provided to the encoder unit (3) along with the depth image which is an output of the generating unit (23).

Although the first exemplary embodiment of the present disclosure has explained that the depth image is generated by providing the IR images to the depth image generating unit (2), the depth image may be generated by simultaneously providing the RGB images and the IR images.

According to the first exemplary embodiment of the present disclosure, the IR emission unit (12) emits an IR, the first and second sensor units (11 and 13) obtain the RGB images and IR images to generate the depth image and the color image using the obtained RGB images and IR images, whereby an accurate depth image can be extracted even in a low light level and an accurate 3D image processing can be performed.

MODE FOR THE INVENTION

FIG. 2 is a block diagram illustrating a image processing system according to a second exemplary embodiment of the present disclosure.

Referring to FIG. 2, the image processing system according to the second exemplary embodiment of the present disclosure may include a camera unit (1), a depth image generating unit (2) and a color image generating unit (4), where a depth image of stereo image extracted from the depth image generating unit (2) and a color image outputted from the color image generating unit (4) may be provided to an encoder unit (3).

The camera unit (1) according to the second exemplary embodiment of the present disclosure may comprise a first sensor unit (11), an IR emission unit (12), a light receiving unit (14), and a second sensor unit (13). The depth image generating unit (2) may comprise a synchronization unit (21), an IR interpolation unit (28), a multiplexer (29, MUX), an alignment unit (22), a generating unit (23), a controller (24) and a switch unit (25). Furthermore, the color image generating unit (4) may comprise an RGB interpolation unit (41), a synthesis unit (42) and a convergence angle controller (43).

The second exemplary embodiment of the present disclosure is different from the first embodiment of the present disclosure in terms of configuration of the light receiving unit (14) of the camera unit (1), and the controller (24) of the depth image generating unit (2), the switch unit (25) and the MUX (29), and therefore, explanation will be focused on the difference from the first embodiment of FIG. 1.

The first and second sensor units (11 and 13) of the camera unit (1) respectively obtain the left and right RGB images or RGB images and IR images. The IR emission unit (12) is in an OFF state under a normal intensity of illumination, and is changed to an ON state by control of the controller (24), in a case the intensity of illumination of the light receiving unit (14) detects that a light level is less than a predetermined intensity of illumination.

The light receiving unit (14) may receive light of an area arranged with the camera unit (1), and transmit an intensity of light (illumination) to the controller (24) of the depth image generating unit (2). The light receiving unit (14) may be a photo sensor or a luminance sensor, but the present disclosure is not limited thereto.

The controller (24) may receive the intensity of light from the light receiving unit (14) and turn on the IR emission unit (12), in a case the received intensity of light is less than a predetermined light level, and control the switch unit (22) to turn off the IR emission unit (12), in a case the received intensity of light is more than a predetermined light level. The switch unit (22) may switch the ON and OFF of the IR emission unit (12) in response to the control of the controller (24).

The synchronization unit (21) according to the second exemplary embodiment of the present disclosure may receive the RGB images from the first and second sensor units (11 and 13), in case of normal intensity of illumination, and receive the RGB images and IR images in case of being less than the predetermined intensity of illumination.

Thus, the synchronization unit (21) may perform the synchronization where the receiving time of left and right images are evenly adjusted, where, in case of a normal illumination (i.e., in a case only the RBG image is received), the synchronization unit (21) transmits the RGB image to the RGB interpolation unit (41), and in case of being less than a predetermined illumination level (i.e., in a case the RGB image and the IR image are received), the RGB image is transmitted to the RGB interpolation unit (41), and the IR image is transmitted to the IR interpolation unit (28).

Although the second exemplary embodiment of the present disclosure has explained that the IR image and the RGB image are separated to respectively generate the depth image and the color image, it is also possible that the IR image and the RGB image are simultaneously provided to generate the depth image.

Furthermore, in a case the interpolation is performed on the images obtained by the first and second sensor units (11 and 13) for supply to the synchronization unit (21), the IR interpolation unit (28) and the RGB interpolation unit (41) may not be included, and in this case, the left and right images performed with the synchronization by the synchronization unit may be directly provided to the synthesis unit (42) and the MUX (29).

That is, in a normal intensity of illumination, the RGB image performed with the synchronization by the synchronization unit (21) may be provided to the MUX (29) to generate the depth image, and may be provided to the synthesis unit (42) to generate the depth image. Furthermore, in case of being less than a predetermined intensity of illumination, the synchronization unit (21) may perform the synchronization, and RGB image may be provided to the synthesis unit (42), and the IR image may be provided to the MUX (29) to respectively generate the color image and the depth image.

Now, operation of the image processing system according to the second exemplary embodiment of the present disclosure will be described.

In case of normal intensity of illumination, i.e., in case of the intensity of illumination detected by the light receiving unit (14) being within a normal light level, the image processing system according to the second exemplary embodiment of the present disclosure is operated in such a way that the synchronization unit (21) performs the synchronization on the RGB images obtained by the first and second sensor units (11, 13), and the RGB interpolation unit (41) performs the RGB interpolation on the left and right images performed with the synchronization.

At this time, a black-and-white data in the RGB image {e.g., brightness (Y) data} may be provided from the RGB interpolation unit (41) to the MUX (29), and the alignment unit (22) may align the left and right images relative to the black-and-white data, and the generating unit (23) may generate a depth image thereto. Only the black-and-white image is used for generation of depth image, and therefore, the depth image can be generated by this method.

Furthermore, the image interpolated by the RGB interpolation unit (41) is provided to the synthesis unit (42) to be synthesized in color image and the convergence angle controller (43) performs the convergence angle control, whereby the color image is outputted. The output is provided to the encoder unit (3) along with the depth image which is an output of the generating unit (23). At this time, the power of the IR emission unit (12) is in an OFF state.

However, in a case the intensity of luminance of the light detected by the light receiving unit is less than a predetermined intensity of illumination, the controller (24) controls the switch unit (25) to change the power of the IR emission unit (12) to an ON state. In a case the IR emission unit (12) is changed to the ON state to emit an IR to a target, the first and second sensor units (11 and 13) obtain the RGB image and the IR image respectively.

Thereafter, the synchronization unit (21) performs the synchronization on the left and right RGB images and the IR image, where the IR image is transmitted to the IR interpolation unit (28) and the RGB images are transmitted to the RGB interpolation unit (41). To this end, a distribution unit for distributing the IR image and the RGB image may be disposed at a rear end of the synchronization unit (21), which was already explained.

The IR interpolation unit (28) performs an interpolation on the transmitted IR image and transmits the interpolated IR image to the MUX (29). In this case, an input of the MUX (29) is the interpolated IR image, and the MUX (29) outputs the interpolated IR image to the alignment unit (22). The alignment unit (22) may align the left and right images (i.e., IR images), which may be received by the generating unit (23) to generate a depth image.

Furthermore, the RGB images transmitted from the synchronization unit (21) to the RGB interpolation unit (41) is interpolated by the RGB interpolation unit (41), the interpolated image is provided to the synthesis unit (42) to be synthesized in color image, which is a 3D format, and the convergence angle controller (43) performs the convergence angle control, whereby a color image can be outputted. The output is provided to the encoder unit (3) along with the depth image, which is the output of the generating unit (23).

According to the second exemplary embodiment of the present disclosure, the image processing system can detect a low light level while performing a general operation under a normal light level, to obtain an IR image in addition to an RGB image, whereby an accurate depth image can be generated.

FIG. 3 is a block diagram illustrating a image processing system according to a third exemplary embodiment of the present disclosure.

Referring to FIG. 3, the image processing system according to the third exemplary embodiment of the present disclosure may include a camera unit (1), a depth image generating unit (2) and a color image generating unit (4), where a depth image of stereo image extracted from the depth image generating unit (2) and a color image outputted from the color image generating unit (4) may be provided to an encoder unit (3).

The camera unit (1) according to the third exemplary embodiment of the present disclosure may comprise a first sensor unit (11), an IR emission unit (12), and a second sensor unit (13), where the depth image generating unit (2) may include a synchronization unit (21), an alignment unit (22), an IR interpolation unit (28), an MUX (29), an alignment unit (22), a generating unit (23), an luminance detector (26) and a switch unit (27).

The third exemplary embodiment of the present disclosure is different from the first embodiment of the present disclosure of FIG. 1 in terms of structure in that the third embodiment includes the lumination detector (26) of the depth image generating unit (2), the switch unit (27) and the MUX (29), and therefore, explanation will be focused on the difference from the first embodiment. Furthermore, any overlapped explanation with the second exemplary embodiment will be also omitted.

The first and second sensor units (11 and 13) of the camera unit (1) respectively obtain the left and right RGB images and/or IR images. The IR emission unit (12) is in an OFF state under a normal intensity of illumination, and is changed to an ON state by switching of the switch unit (27), in a case the intensity of illumination of the luminance detector (26) of the depth image generating unit (2) is less than a predetermined intensity of illumination.

The luminance detector (26) of the depth image generating unit (2) receives RGB images performed with synchronization by the synchronization unit (21) to monitor an average of pixel values of the image, and in a case the average of pixels is less than a threshold, which is determined as a low intensity of luminance, and allows the switch unit (27) to change the IR emission unit (12) to an ON state.

The switch unit (27) switches ON and OFF of the IR emission unit (12) in response to the control of the luminance detector (26).

In the synchronization unit (21) according to third exemplary embodiment of the present disclosure may receive the RGB image in case of the normal intensity of illumination from the first and second sensor units (11 and 13), and may receive the RGB images and IR image in case of being less than a predetermined intensity of illumination.

Now, operation of the image processing system according to the third exemplary embodiment of the present disclosure will be described.

In case of normal intensity of illumination, i.e., in case of the intensity of illumination detected by the luminance detector (26) being within a normal light level, the image processing system according to the third exemplary embodiment of the present disclosure is operated in such a way that the synchronization unit (21) performs the synchronization on the RGB images obtained by the first and second sensor units (11 and 13), and the RGB interpolation unit (41) performs the RGB interpolation on the left and right images performed with the synchronization.

At this time, a black-and-white data in the RGB image {e.g., brightness (Y) data} may be provided from the RGB interpolation unit (41) to the MUX (29), and the alignment unit (22) may align the left and right images relative to the black-and-white data, and the generating unit (23) may generate a depth image thereto. Only the black-and-white image is used for generation of depth image, and therefore, the depth image can be generated by this method.

Furthermore, the image interpolated by the RGB interpolation unit (41) is provided to the synthesis unit (42) to be synthesized in color image, and the convergence angle controller (43) performs the convergence angle control, whereby the color image is outputted. The output is provided to the encoder unit (3) along with the depth image which is an output of the generating unit (23). At this time, the power of the IR emission unit (12) is in an OFF state.

However, in a case the intensity of luminance being less than a predetermined intensity of illumination, the illumination detector (26) controls the switch unit (27) to change the power of the IR emission unit (12) to an ON state. In a case the IR emission unit (12) is changed to the ON state to emit an IR to a target, the first and second sensor units (11, 13) obtain the RGB image and the IR image respectively.

Thereafter, the synchronization unit (21) performs the synchronization on the left and right RGB images and the IR image, where the IR image is transmitted to the IR interpolation unit (28) and the RGB images are transmitted to the RGB interpolation unit (41). To this end, a distribution unit for distributing the IR image and the RGB image may be disposed at a rear end of the synchronization unit (21), which was already explained.

The IR interpolation unit (28) performs an interpolation on the transmitted IR image and transmits the interpolated IR image to the MUX (29). In this case, an input of the MUX (29) is the interpolated IR image, and the MUX (29) outputs the interpolated IR image to the alignment unit (22). The alignment unit (22) may align the left and right images, which may be received by the generating unit (23) to generate a depth image.

Furthermore, the RGB images transmitted from the synchronization unit (21) to the RGB interpolation unit (41) is interpolated by the RGB interpolation unit (41), the interpolated image is provided to the synthesis unit (42) to be synthesized in color image, which is a 3D format, and the convergence angle controller (43) performs the convergence angle control, whereby a color image can be outputted. The output may be provided to the encoder unit (3) along with the depth image, which is the output of the generating unit (23).

According to the second exemplary embodiment of the present disclosure, the image processing system can detect a low light level while performing a general operation under a normal light level, to obtain an IR image in addition to an RGB image, whereby an accurate depth image can be generated.

In the above second and third exemplary embodiments of the present disclosure, the MUX (29) may receive an image from any one of the RGB interpolation unit (41) and the IR interpolation unit (28) and transmit the image to the alignment unit (22). At this time, an image transmitted to the alignment unit (22) is determined prior to MUX (29) step, the image may be directly transmitted to the alignment (22).

Furthermore, in the exemplary embodiments of the present disclosure, in a case the images interpolated by the first and second sensor units (11 and 13) are outputted, it should be apparent that the IR interpolation unit (28) and the RGB interpolation unit (41) may not be included in the first, second and third exemplary embodiments, which has been already explained in the foregoing.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

The invention claimed is:

1. An image processing system, comprising:
a camera unit configured to generate left and right RGB images, or left and right RGB images and left and right IR images (RGB/IR images);
a depth image generating unit configured to control the camera unit to obtain one or more images of the RGB images and the RGB/IR images, and generate a depth image from the images received from the camera unit; and
a color image generating unit configured to generate a color image from the RBG images received from the camera unit;
wherein the depth image generating unit comprises:
an IR interpolation unit configured to perform an interpolation on the received IR images and to transmit the interpolated IR images to a MUX;
an alignment unit configured to perform a calibration such that the left and right IR images are aligned; and
a generating unit configured to generate a depth image thereto,
wherein the color image generating unit comprises a RGB interpolation unit configured to interpolate the RGB images received from a synchronization unit.

2. The system of claim 1, wherein the camera unit comprises:
a first sensor unit configured to obtain the left RGB image or the left RGB/IR image,
a second sensor unit configured to obtain the right RGB image or the right RGB/IR image.

3. The system of claim 1, wherein the depth image generating unit further comprises:
a controller configured to control ON and OFF states of an IR emission unit in response to illumination detected by a light receiving unit.

4. The system of claim 3, wherein the controller controls the IR emission unit to be changed to the ON state when a level of the illumination detected by the light receiving unit is lower than a predetermined level of illumination.

5. The system of claim 1, wherein the depth image generating unit further comprises a switching unit configured to switch ON and OFF states of an IR emission unit in response to control of a controller.

6. The system of claim 1, wherein the camera unit comprises:
a second sensor unit configured to obtain the right RGB image or the right RGB/IR image.

7. The system of claim 1, wherein the camera unit comprises:
a light receiving unit detecting illumination.

8. The system of claim 1, wherein the camera unit comprises:
at least one IR emission unit configured to emit an IR.

9. The system of claim 1, wherein the synchronization unit is configured to perform synchronization on the left and right RGB images and the IR image, wherein the IR image is transmitted to the IR interpolation unit and the RGB images are transmitted to the RGB interpolation unit.

10. The system of claim 1, wherein the MUX is configured to output the interpolated IR image to the alignment unit.

11. The system of claim 1, wherein the synthesis unit is configured to synthesize the left and right RGB images received from the RGB interpolation unit in a 3D format; and the depth color image generating unit further comprises a convergence angle controller configured to perform convergence angle control.

12. The system of claim 1, further comprising an encoder unit configured to receive calibration data from first and second sensor units of the camera unit, convert the calibration data to an alignment parameter, and transmit the alignment parameter to the alignment unit.

* * * * *